(12) United States Patent
Ringseth et al.

(10) Patent No.: US 8,650,570 B2
(45) Date of Patent: Feb. 11, 2014

(54) METHOD OF ASSIGNING INSTRUCTIONS IN A PROCESS TO A PLURALITY OF SCHEDULER INSTANCES BASED ON THE INSTRUCTION, IN WHICH EACH SCHEDULER INSTANCE IS ALLOCATED A SET OF NEGOITAITED PROCESSOR RESOURCES

(75) Inventors: Paul Ringseth, Bellevue, WA (US); Genevieve Fernandes, Redmond, WA (US); Niklas Gustafsson, Bellevue, WA (US); Rick Molloy, Redmond, WA (US); Rahul Patil, Sammamish, WA (US); Philip Lucido, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1126 days.

(21) Appl. No.: 12/131,135

(22) Filed: Jun. 2, 2008

(65) Prior Publication Data

US 2009/0300637 A1    Dec. 3, 2009

(51) Int. Cl.
*G06F 9/46* (2006.01)
(52) U.S. Cl.
USPC .......................................... 718/102; 718/104
(58) Field of Classification Search
USPC .................................. 718/102, 104
See application file for complete search history.

(56) References Cited

U.S. PATENT DOCUMENTS

| | | | |
|---|---|---|---|
| 5,394,547 A | 2/1995 | Correnti et al. | |
| 6,263,358 B1 | 7/2001 | Lee et al. | |
| 6,269,391 B1 | 7/2001 | Gillespie | |
| 6,668,269 B1 | 12/2003 | Kamada et al. | |
| 6,839,748 B1 | 1/2005 | Allavarpu et al. | |
| 6,901,405 B1 | 5/2005 | McCrady et al. | |
| 6,947,425 B1 | 9/2005 | Hooper et al. | |
| 7,457,886 B1 * | 11/2008 | Smith | 710/6 |
| 2002/0073129 A1 * | 6/2002 | Wang et al. | 709/102 |
| 2004/0221285 A1 * | 11/2004 | Donovan et al. | 718/1 |
| 2005/0004970 A1 | 1/2005 | Jain et al. | |
| 2005/0076339 A1 * | 4/2005 | Merril et al. | 718/104 |
| 2005/0223191 A1 | 10/2005 | Ferris | |
| 2006/0005188 A1 | 1/2006 | Vega et al. | |
| 2006/0095908 A1 * | 5/2006 | Norton et al. | 718/100 |
| 2006/0155973 A1 | 7/2006 | Soltis, Jr. | |
| 2006/0179279 A1 * | 8/2006 | Jones et al. | 712/214 |
| 2006/0294522 A1 | 12/2006 | Havens | |
| 2007/0074217 A1 | 3/2007 | Rakvie et al. | |
| 2007/0083735 A1 * | 4/2007 | Glew | 712/214 |
| 2007/0204268 A1 * | 8/2007 | Drepper | 718/102 |
| 2008/0235701 A1 * | 9/2008 | Danko | 718/104 |
| 2009/0282415 A1 * | 11/2009 | An et al. | 718/104 |

FOREIGN PATENT DOCUMENTS

WO    2006084845 A3    8/2006

OTHER PUBLICATIONS

PCT Search Report for Application No. PCT/US2009/042609 mailed on Dec. 18, 2009 (12 pages).
Weiderman, et al., "Ada for Embedded Systems: Issues and Questions", Dec. 1987, pp. 1-86.

(Continued)

*Primary Examiner* — Thomas Lee
*Assistant Examiner* — Terrell Johnson

(57) ABSTRACT

A runtime environment of a computer system is provided that creates first and second scheduler instances in a process. Each scheduler instance includes allocated processing resources and is assigned a set of tasks for execution. Each scheduler instance schedules tasks for execution using the allocated processing resources to perform the work of the process.

16 Claims, 5 Drawing Sheets

(56) References Cited

OTHER PUBLICATIONS

"Scheduling", http://pdos.csail.mit.edu/6.828/2007/lec/l-schedule.html.

Chinese Office Action for Application No. 200980121240.4 mailed Aug. 29, 2012 (8 pages).

Supplemental European Search Report for Application No. EP 09 75 8901 mailed Sep. 7, 2012 (6 pages).

Ford, Bryan et al., "Microkernels Meet Recursive Virtual Machines," USENIX Association, Second Symposium on Operating Systems Design and Implementation, pp. 137-151 (Dec. 1996).

Communication for EP Application No. 09 758 901.4 mailed Sep. 5, 2013 (6 pages).

Translation of the Notice of Rejection for Patent Application No. 2011-512497 dispatched Aug. 7, 2013 (8 pages).

Kitaguchi et al., "Flexible Scheduling Mechanism by User-Level Thread Library PPL," Journal of Information Processing Society of Japan, Information Processing Society of Japan, vol. 40, No. 6, pp. 2585 to 2595 (Jun. 15, 1999).

* cited by examiner

METHOD OF ASSIGNING INSTRUCTIONS IN A PROCESS TO A PLURALITY OF SCHEDULER INSTANCES BASED ON THE INSTRUCTION, IN WHICH EACH SCHEDULER INSTANCE IS ALLOCATED A SET OF NEGOITAITED PROCESSOR RESOURCES

BACKGROUND

Processes executed in a computer system often have tasks with different priorities. In order to operate as desired, a process may expend significant overhead to ensure that suitable processing resources are allocated to tasks based on the priorities of the tasks. This overhead may include the use of a scheduler that schedules tasks of the process for execution in the computer system.

Processes with a single scheduler typically share processing resources among all the tasks generated by the process and apply the same scheduling policy to all tasks. Generally, a process does not have the ability to directly prioritize a subset of tasks by applying a different scheduling policy to the subset. While a developer may partition subsets of tasks and assign the partition to execution contexts offered by an operating system, this approach may force a developer to engineer a complex infrastructure that may not be optimal in computer systems where resources are allocated dynamically.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A runtime environment of a computer system is provided that creates multiple scheduler instances in a process. Each scheduler instance includes allocated processing resources and is assigned a set of tasks for execution. A scheduler instance schedules tasks for execution using the allocated processing resources to perform the work of the process. In addition, a task in one scheduler instance may create a nested scheduler instance.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown, by way of illustration, specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
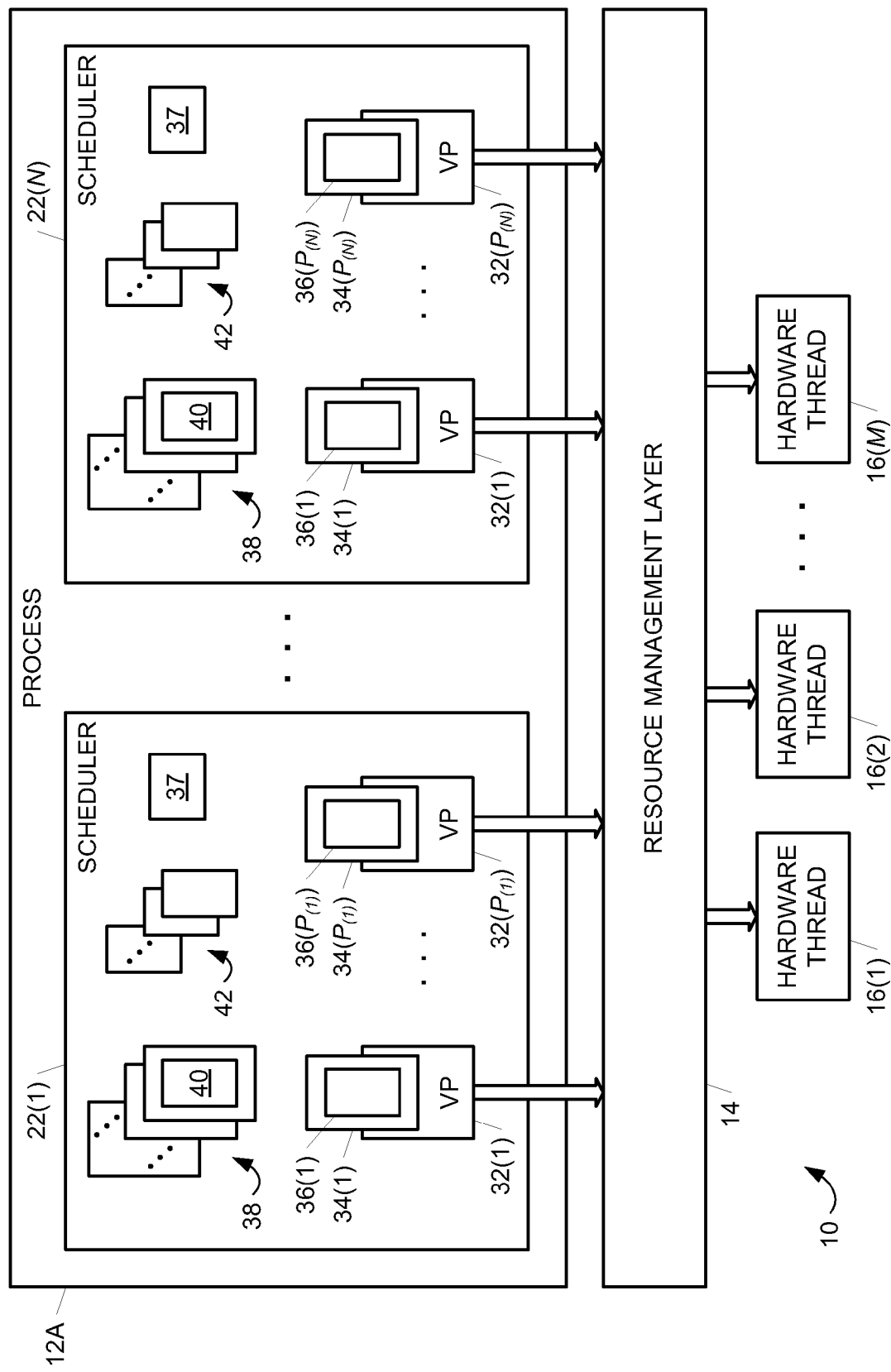
FIG. 1 is a block diagram illustrating an embodiment of a runtime environment with a process that includes multiple scheduler instances.

FIG. 1 is a block diagram illustrating an embodiment of a runtime environment 10 with a process 12A that includes multiple scheduler instances 22(1)-22(N), where N is an integer greater than or equal to two and denotes the Nth scheduler instance 22(N).

Runtime environment 10 represents a runtime mode of operation in a computer system, such as computer system 100 shown in FIG. 7 and described in additional detail below, where the computer system is executing instructions. The computer system generates runtime environment 10 from a runtime platform such as a runtime platform 122 shown in FIG. 7 and described in additional detail below.

Runtime environment 10 includes an least one invoked process 12A, a resource management layer 14, and a set of hardware threads 16(1)-16(M), where M is an integer that is greater than or equal to one and denotes the Mth hardware thread 16(M). Runtime environment 10 allows tasks from process 12A to be executed, along with tasks from any other processes that co-exist with process 12A (not shown), using resource management layer 14 and hardware threads 16(1)-16(M). Runtime environment 10 operates in conjunction with resource management layer 14 to allow process 12A to obtain processor and other resources of the computer system (e.g., hardware threads 16(1)-16(M)). Runtime environment 10 also operates in conjunction with resource management layer 14 to allow multiple scheduler instances 22(1)-22(N) to co-exist in process 12A.

Runtime environment 10 includes a scheduler function that generates each scheduler instance 22. In one embodiment, the scheduler function is implemented as a scheduler application programming interface (API). In other embodiments, the scheduler function may be implemented using other suitable programming constructs. When invoked, the scheduler function creates a scheduler instance 22 in process 12A or another co-existing process where each scheduler instance 22 operates to schedule tasks of process 12A for execution by one or more hardware threads 16(1)-16(M). Runtime environment 10 may exploit fine grained concurrency that application or library developers express in their programs (e.g., process 12A) using accompanying tools that are aware of the facilities that the scheduler function provides.

Process 12A includes an allocation of processing and other resources that hosts one or more execution contexts (viz., threads). Process 12A obtains access to the processing and other resources in the computer system (e.g., hardware threads 16(1)-16(M)) from resource management layer 14. Process 12A causes tasks to be executed using the processing and other resources.

Process 12A generates work in tasks of variable length where each task is associated with an execution context in a scheduler instance 22. Each task includes a sequence of instructions that perform a unit of work when executed by the computer system. Each execution context forms a thread (or analogous OS concept such as child process) that executes associated tasks on allocated processing resources. Each execution context includes program state and machine state information. Execution contexts may terminate when there are no more tasks left to execute. For each task, runtime environment 10 and/or process 12A either assign the task to a scheduler instance 22 to be scheduled for execution or otherwise cause the task to be executed without using a scheduler instance 22.

Process 12A may be configured to operate in a computer system based on any suitable execution model, such as a stack model or an interpreter model, and may represent any suitable type of code, such as an application, a library function, or an operating system service. Process 12A has a program state and machine state associated with a set of allocated resources that include a defined memory address space. Process 12A executes autonomously or substantially autonomously from any co-existing processes in runtime environment 10. Accordingly, process 12A does not adversely alter the program state of co-existing processes or the machine state of any resources allocated to co-existing processes. Similarly, co-existing processes do not adversely alter the program state of process 12A or the machine state of any resources allocated to process 12A.

Resource management layer 14 allocates processing resources to process 12A by assigning one or more hardware threads 16 to process 12A. Resource management layer 14 exists separately from an operating system of the computer system (not shown in FIG. 1) in the embodiment of FIG. 1. In other embodiments, resource management layer 14 or some or all of the functions thereof may be included in the operating system.

Hardware threads 16 reside in execution cores of a set or one or more processor packages (e.g., processor packages 102 shown in FIG. 7 and described in additional detail below) of the computer system. Each hardware thread 16 is configured to execute instructions independently or substantially independently from the other execution cores and includes a machine state. Hardware threads 16 may be included in a single processor package or may be distributed across multiple processor packages. Each execution core in a processor package may include one or more hardware threads 16.

Process 12A implicitly or explicitly causes each scheduler instance 22(1)-22(N) to be created via the scheduler function provided by runtime environment 10. A scheduler instance 22 may be implicitly created when process 12A uses APIs available in the computer system or programming language features. In response to the API or programming language features, runtime environment 10 creates a scheduler instance 22 with a default policy 37. To explicitly create a scheduler instance 22, process 12A may invoke the scheduler function provided by runtime environment 10 and specify one or more policies 37 for the scheduler instance 22. Process 12A may increase or decrease the number of invoked scheduler instances 22 throughout its execution.

Each scheduler instance 22 interacts with resource management layer 14 to negotiate processing and other resources of the computer system in a manner that is transparent to process 12. Resource management layer 14 allocates hardware threads 16 to scheduler instances 22 based on supply and demand and any policies 37 of scheduler instances 22.

In the embodiment shown in FIG. 1, scheduler instances 22 manage the processing resources by creating virtual processors 32 that form an abstraction of underlying hardware threads 16. Each scheduler instance 22 includes a set of virtual processors 32(1)-32(P) where each P is an integer greater than or equal to one and denotes the Pth virtual processor 32(P) in a scheduler instance 22. Each scheduler instance 22 may have the same or different numbers of virtual processors 32 at various points in the execution of process 12A (i.e., each $P_{(1)}$-$P_{(M)}$ may be less than, greater than, or equal to any other of $P_{(1)}$-$P_{(M)}$ during the execution of process 12A). Each scheduler instance 22 multiplexes virtual processors 32 onto hardware threads 16 by mapping each virtual processor 32 to a hardware thread 16. Each scheduler instance 22 may map more than one virtual processor 32 onto a particular hardware thread 16 but maps only one hardware thread 16 to each virtual processor 32. In other embodiments, each scheduler instance 22 manages processing resources in other suitable ways to cause instructions of process 12 to be executed by hardware threads 16.

The set of execution contexts in each scheduler instance 22 includes a set of execution contexts 34(1)-34(P) with respective, associated tasks 36(1)-36(P) that are being executed by respective virtual processors 32(1)-32(P) and, at any point during the execution of process 12A, a set of zero or more execution contexts 38. Each execution context 34 and 38 includes state information that indicates whether an execution context 34 or 38 is executing, runnable (e.g., in response to becoming unblocked or added to a scheduler instance 22), or blocked. Execution contexts 34 that are executing have been attached to a virtual processor 32 and are currently executing. Execution contexts 38 that are runnable include an associated task 40 and are ready to be executed by an available virtual processor 32. Execution contexts 38 that are blocked also include an associated task 40 and are waiting for data, a message, or an event that is being generated by another execution context 34 or will be generated by another execution context 38.

Each execution context 34 executing on a virtual processor 32 may generate, in the course of its execution, additional tasks 42, which are organized in any suitable way (e.g., added to work queues (not shown in FIG. 1)). Work may be created by using either application programming interfaces (APIs) provided by runtime environment 10 or programming language features and corresponding tools in one embodiment. When processing resources are available to a scheduler instance 22, tasks are assigned to execution contexts 34 or 38 that execute them to completion or a blocking point (e.g. waiting for a message or a stolen child task to complete) on virtual processors 32 before picking up new tasks. When a task unblocks, the task is re-scheduled to execute on an available virtual processor, possibly with priority given to choosing a virtual processor 32 on the hardware thread 16 where it executed before blocking, in the hope that the memory hierarchy (viz., cache hierarchy) already contains data that can be optimally reused. An execution context 34 executing on a virtual processor 32 may also unblock other execution contexts 38 by generating data, a message, or an event that will be used by other execution contexts 38.

Figure 6:
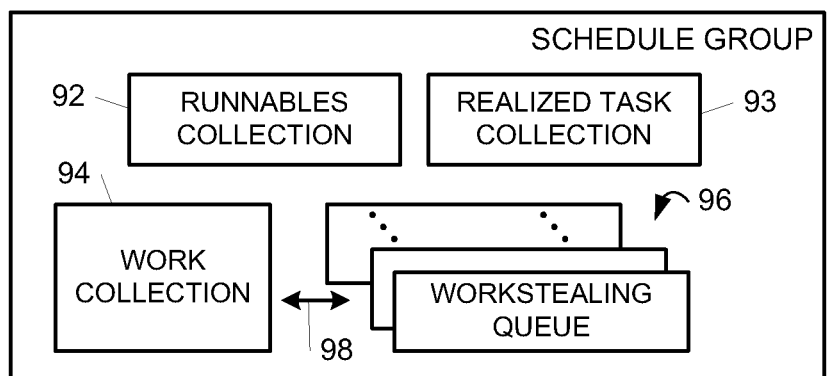
FIG. 6 is a block diagram illustrating an embodiment of a schedule group for use in a scheduler.

Each task in each scheduler instance 22 may be realized (e.g., realized tasks 36 and 40), which indicates that an execution context 34 or 38 has been or will be attached to the task and the task is ready to execute. Realized tasks typically include unblocked execution contexts and scheduled agents. A task that is not realized is termed unrealized. Unrealized tasks (e.g., tasks 42) may be created as child tasks generated by the execution of parent tasks and may be generated by parallel constructs (e.g., parallel, parallel for, begin, and finish). Each scheduler instance 22 may be organized into a synchronized collection (e.g., a stack and/or a queue) for logically independent tasks with execution contexts (i.e., realized tasks) along with a list of workstealing queues for dependent tasks (i.e., unrealized tasks) as illustrated in the embodiment of FIG. 6 described below.

Upon completion, blocking, or other interruption (e.g., explicit yielding or forced preemption) of a task 36 associated with an execution context 34 running on a virtual processor 32, the virtual processor 32 becomes available to execute another realized task 40 or unrealized task 42. A scheduler instance 22 searches for a runnable execution context 38 or an unrealized task 42 to attach to the available virtual processor 32 for execution in any suitable way. For example, a scheduler instance 22 may first search for a runnable execution context 38 to execute before searching for an unrealized task 42 to execute. Each scheduler instance 22 continues attaching execution contexts 38 to available virtual processors 32 for execution until all tasks and execution contexts 38 of the scheduler instance 22 have been executed.

Scheduler instances 22 may have execution contexts of heterogeneous types. In embodiments of the computer system that include the Windows operating system where process 12A is a Windows process, different scheduler instances 22 in a Windows process may include thread execution contexts and fiber execution contexts. Accordingly, thread execution contexts and fiber execution contexts may exist in the same Windows process.

Figure 7:
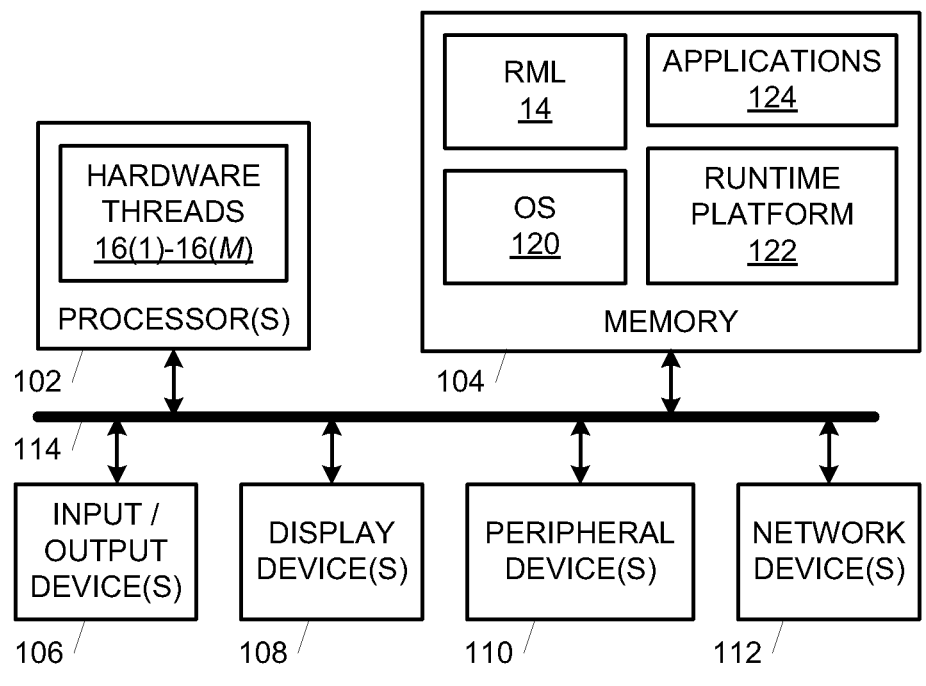
FIG. 7 is a block diagram illustrating an embodiment of a computer system configured to implement a runtime environment with a process that includes multiple scheduler instances.

Prior to executing tasks, each scheduler instance 22 obtains execution contexts 34 and 38 from runtime environment 10 or an operating system (e.g., OS 120 of FIG. 7). Available virtual processors 32 locate and execute execution contexts 34 to begin executing tasks. Virtual processors 32 become available again in response to a task 36 associated with an execution context 34 completing, blocking, or otherwise being interrupted. When virtual processors 32 become available, virtual processors 32 switch to a runnable execution context 38 or execute a next task 40 or 42 as a continuation on a current execution context 34 if the previous task 36 executed by the current execution context 34 completed.

In one embodiment, scheduler instances 22 operate autonomously from each other and communicate with a common resource management layer 14 underneath. In other embodiments, scheduler instances 22 communicate with resource management layer 14 and with each other in order to allow work scheduled on one instance of a scheduler instance 22 to co-ordinate with work scheduled on another scheduler instance 22.

Scheduler instances 22 may each have the same or different policies 37. Runtime environment 10 and/or process 12A specify policies 37 for a scheduler instance 22 when the scheduler instance 22 is invoked. Policies 37 of each scheduler instance 22 may specify one or more of:

1) a number of processing resources to be allocated (e.g., a minimum, a desired, and/or a maximum number);
2) a sharing type (e.g., exclusive or sharable);
3) a priority type (e.g., high, medium, or low);
4) a fairness type (e.g., enhance cache locality or enhance fairness);
5) behavior types (e.g., a rogue chore threshold, an idle threshold, a fragmentation threshold, and/or other resource reallocation behaviors);
6) an execution order type (e.g., a last-in-first-out (LIFO) order, a first-in-first-out (FIFO) order, or a default order for quality of service or ordering guarantees); and
7) a topology type (i.e., information that specifies a particular locality characteristic (e.g., a set of related processing resources in a computer system) and/or information that specifies a particular resource characteristic (e.g., a set of processing resources with selected chipset capabilities in a computer system)).

In addition to process 12A, other co-existing processes in runtime environment 10 (not shown) may include zero or more scheduler instances 22 that may increase or decrease throughout the execution of the processes.

Figure 2:
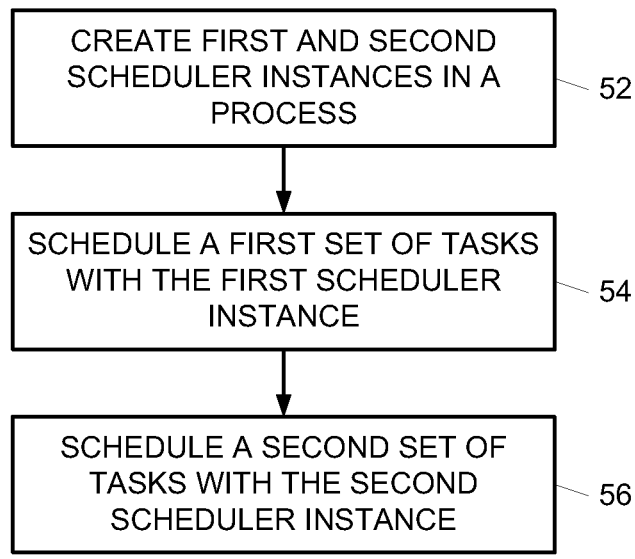
FIG. 2 is a flow chart illustrating an embodiment of a method for creating multiple scheduler instances in a process.

FIG. 2 is a flow chart illustrating an embodiment of a method for creating multiple scheduler instances 22 in process 12A. The method of FIG. 2 may be performed implicitly or explicitly by process 12A and/or runtime environment 10 in a computer system in one embodiment.

At least first and second scheduler instances 22(1) and 22(2) are created in process 12A as indicated in a block 52. Scheduler instances 22(1) and 22(2) each include instructions executable by the computer system to cause respective sets of one or more tasks assigned by runtime environment 10 and/or process 12A to be executed on respective subsets of processing resources. The set of processing resources includes hardware threads 16 and, in one embodiment, also includes virtual processors 32 allocated by resource management layer 14. Where resource management layer 14 allocates sets of virtual processors 32 to scheduler instances 22(1) and 22(2), the sets of virtual processors 32 represent respective subsets of processor resources (i.e., hardware threads 16) of the computer system. Accordingly, resource management layer 14 maps each sets of virtual processors 32 to a respective set of hardware threads 16.

Scheduler instances 22(1) and 22(2) may be implicitly or explicitly initiated by runtime environment 10 and/or process 12A using the scheduler function of runtime environment 10 as described above. Scheduler instances 22(1) and 22(2) may also be initiated at the same time (e.g., when process 12A is initiated) or at different times during the execution of process 12A. In addition, scheduler instances 22(1) and 22(2) may have the same or different policies 37.

Runtime environment 10 and/or process 12A assigns a set of one or more tasks to scheduler instance 22(1) for execution and a set of one or more tasks to scheduler instance 22(2) for execution. Runtime environment 10 and/or process 12A may assign sets of tasks based on respective policies 37 of scheduler instances 22(1) and 22(2) as described in additional detail below with reference to FIG. 3 or based on other criteria.

Referring to FIG. 2, a first set of tasks is scheduled for execution by scheduler instance 22(1) as indicated in a block 54. When a virtual processor 32 of scheduler instance 22(1) becomes available, scheduler instance 22(1) attaches an execution context 34 to the available virtual processor 32 and associates a task from the set of tasks in scheduler instance 22(1) with the execution context 34 to cause the task to be executed by the virtual processor 32 via the underlying hardware thread 16. Scheduler instance 22(1) continues executing tasks from the set of tasks until all of the tasks in scheduler instance 22(1) have been executed.

Likewise, a second set of tasks is scheduled for execution by scheduler instance 22(2) as indicated in a block 56. When a virtual processor 32 of scheduler instance 22(2) becomes available, scheduler instance 22(2) attaches an execution context 34 to the available virtual processor 32 and associates a task from the set of tasks in scheduler instance 22(2) with the execution context 34 to cause the task to be executed by the virtual processor 32 via the underlying hardware thread 16. Scheduler instance 22(2) continues executing tasks from the set of tasks until all of the tasks in scheduler instance 22(2) have been executed.

An example of the use of the method of FIG. 2 will now be described according to one embodiment. In this example, process 12A is an application that performs audio and video processing and the audio processing takes priority over the video processing. Accordingly, process 12A invokes a first scheduler instance 22(1) with a high number of processing resources to perform the audio processing and a second scheduler instance 22(2) with a low number of processing resources to perform the video processing. Runtime environment 10 assigns a set of tasks related to the audio processing to scheduler instance 22(1) as specified by process 12A and assigns a set of tasks related to the video processing to scheduler instance 22(2) as specified by process 12A. If the number of processing resources allocated to process 12A changes, runtime environment 10 may adjust the number of processing resources allocated to scheduler instances 22(1) and/or 22(2) while ensuring that scheduler instance 22(1) has sufficient processing resources for the higher priority audio processing.

Figure 3:
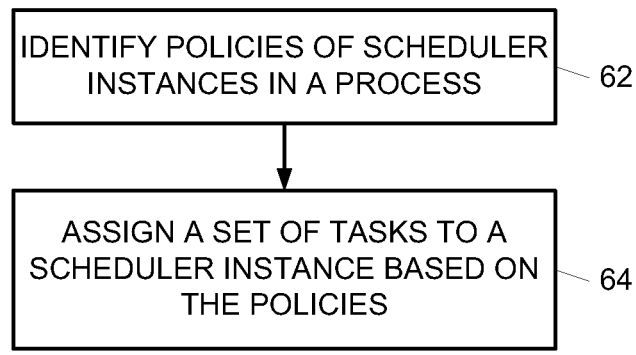
FIG. 3 is a flow chart illustrating an embodiment of a method for assigning execution contexts to scheduler instances in a process.

FIG. 3 is a flow chart illustrating an embodiment of a method for assigning a set of one or more tasks to scheduler instances 22 in process 12A. When runtime environment 10 and/or process 12A determines that a set of tasks is to be assigned to a scheduler instance 22 for execution, runtime environment 10 and/or process 12A identifies policies 37 of all scheduler instances 22 as indicated in a block 62 and assigns the set of tasks to the scheduler instances 22 based on policies 37 as indicated in a block 64.

Runtime environment 10 may provide process 12A with the ability to request a scheduler instance 22 with one or more policies 37 that most closely match one or more policies specified by process 12A. Runtime environment 10 searches scheduler instances 22 in process 12A and selects the scheduler instance 22 based on pre-defined heuristics which may be configured.

Referring back to the example above where process 12A performs audio and video processing, runtime environment 10 may determine from respective policies 37 of scheduler instances 22(1) and 22(2) that a scheduler instance 22(1) is configured to have more processing resources than scheduler instance 22(2). Accordingly, runtime environment 10 may assign higher priority audio processing tasks to scheduler instance 22(1) as specified by process 12A and lower priority video processing tasks to scheduler instance 22(2) as specified by process 12A.

The use of multiple scheduler instances 22 as described above with reference to FIGS. 1-3 may advantageously provide a way of specifying policy restrictions on partitions of work in process 12A. Process developers may choose to create several scheduler instances 22 in a process, each with a different policy 37, and cause units of work to be pushed onto suitable scheduler instances 22 depending on the nature of the work. Developers may tune the parameters of policies 37 of scheduler instances 22 to affect throughput or responsive of processes, as desired.

In addition to sets of tasks assigned to scheduler instances 22, process 12A may obtain access to processing resources that are separate from those allocated to scheduler instances 22. For example, runtime environment 10 may allow process 12A to be allocated virtual processors 32 from resource management layer 14 in addition to those allocated to scheduler instances 22. Runtime environment 10 and/or process 12A may cause selected sets of tasks to be executed on these separate processing resources to cause the selected execution contexts 34 to be executed without using scheduler instances 22.

Figure 4A:
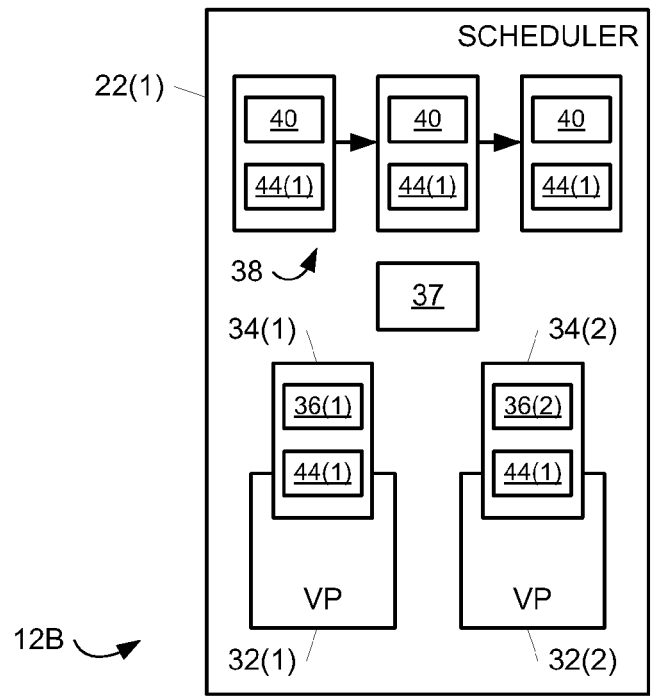
FIGS. 4A-4B are block diagrams illustrating embodiments of nested scheduler instances in a process.
Figure 4B:
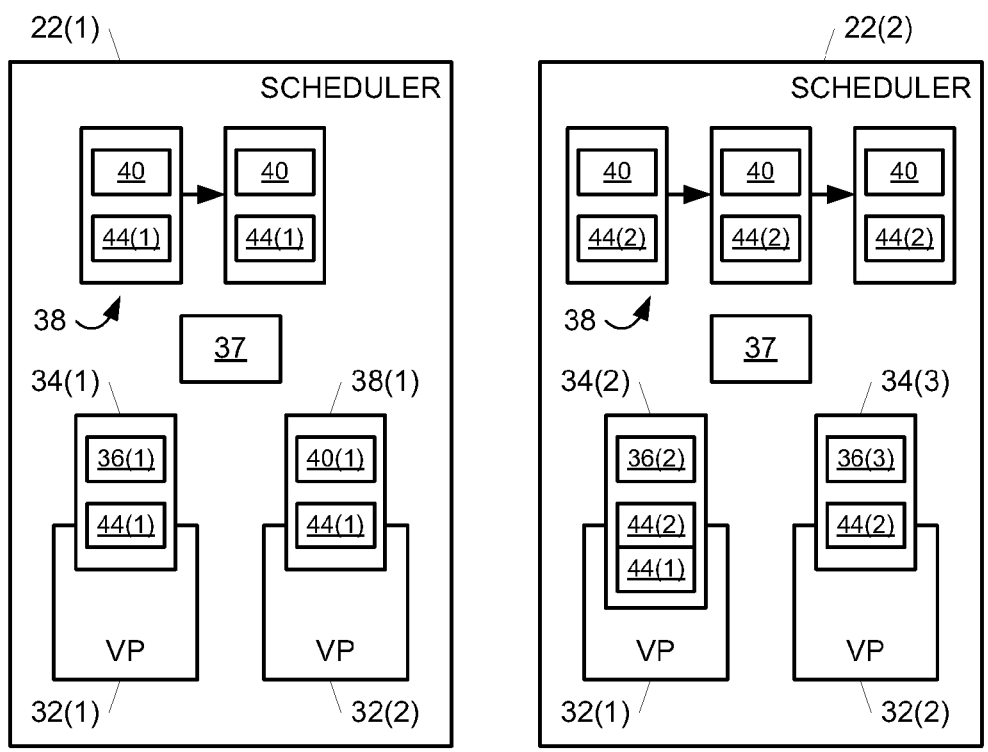
Figure 5:
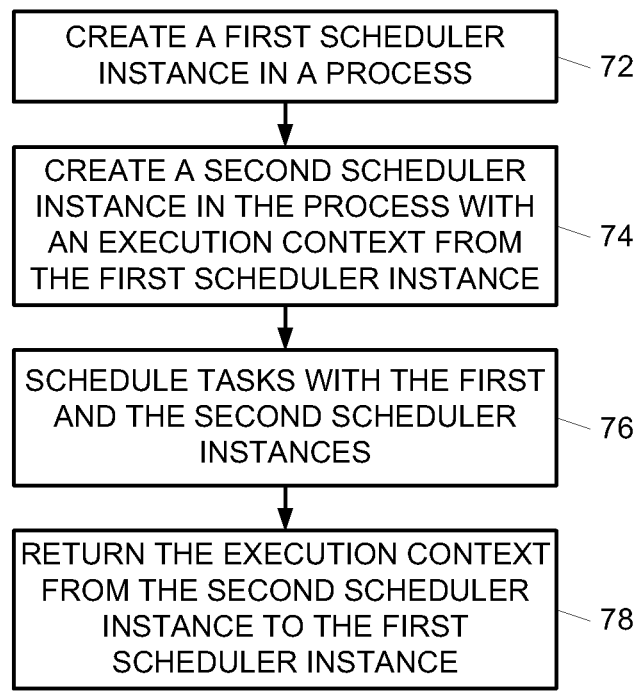
FIG. 5 is a flow chart illustrating an embodiment of a method for creating a nested scheduler instance in a process.

As shown in the embodiments of FIGS. 4A-4B and 5, runtime environment 10 also allows an execution context 34 to dynamically nest a new scheduler instance 22(2) within an existing scheduler instance 22(1). A task 36(2) that is executing on an execution context 34(2) in an existing scheduler instance 22(1) may invoke the scheduler function of runtime environment 10 in order to create a new instance of a scheduler instance 22(2). FIGS. 4A-4B are block diagrams illustrating embodiments of scheduler instances 22(1) and 22(2) existing side by side in a process 12B, where an execution context 34(2) of scheduler instance 22(1) nests scheduler instance 22(2) within scheduler instance 22(1). FIG. 5 is a flow chart illustrating an embodiment of a method for creating a nested scheduler instance 22(2) on an execution context 34 initially belonging to scheduler 22(1) in process 12B.

Referring to FIGS. 4A and 5, a first scheduler instance 22(1) is created in process 12B as indicated in a block 72. In the example of FIG. 4A, scheduler instance 22(1) includes a set of virtual processors 32(1) and 32(2) which are executing execution contexts 34(1) and 34(2), respectively. Scheduler instance 22(1) also includes a pool of execution contexts 38 that are waiting to be executed and policies 37. Each execution context 34(1)-34(2) and 38 includes data 44(1) that identifies scheduler instance 22(1). Data 44(1) is stored with each execution context 34(1)-34(2) and 38 as a result of each execution context 34(1)-34(2) and 38 being allocated to scheduler instance 22(1). Data 44(1) may be stored in a stack in local storage of each execution context 34(1)-34(2) and 38 and represents the first entry that has been pushed onto the stack in one embodiment.

A task 36(2) executing on an execution context 34(2) in scheduler instance 22(1) in process 12B may cause a second scheduler instance 22(2) to be created as indicated in a block 74. Policies 37 of scheduler instance 22(2) may differ from policies 37 of scheduler instance 22(1) to allow scheduler instances 22(1) and 22(2) to execute different sets of tasks with different performance characteristics. In the example of FIGS. 4A and 4B, task 36(2) executing on execution context 34(2) causes scheduler instance 22(2) to be created with policies 37 and thereby dynamically nests scheduler instance 22(2) in execution context 34(2). A virtual processor 32(1) within scheduler instance 22(2) picks up execution context 34(2) for execution. In scheduler instance 22(1), virtual processor 32(2), which was previously assigned to execution context 34(2), becomes available to execute other tasks in scheduler 22(1). Accordingly, virtual processor 32(2) in scheduler instance 22(1) picks execution context 38(1) to execute task 40(1)

Data 44(2) that identifies scheduler instance 22(2) is stored with execution context 34(2) as a result of execution context 34(2) being moved to scheduler instance 22(2). Data 44(2) may be stored in a stack in local storage of execution context 34(2) and is pushed on top of the first entry in the stack which includes data 44(1) in one embodiment. The top entry of the stack indicates the present scheduler instance 22 for each execution context 34.

The nested scheduler instance 22(2) may be created with additional virtual processors 32 such as a virtual processor 32(2) as shown in the example of FIG. 4B.

Scheduler instances 22(1) and 22(2) each schedule respective sets of tasks for execution using respective sets of virtual processors 32 as indicated in a block 76.

Scheduler instance 22(1) continues to schedule tasks of scheduler instance 22(1) for execution on virtual processors 32(1) and 32(2) of scheduler instance 22(1), and scheduler instance 22(2) schedules tasks of scheduler instance 22(1), which are generated by task 36(2) on execution context 34(2), for execution on virtual processors 32(1) and 32(1) of scheduler instance 22(2).

Runtime environment 10 and/or process 12B may continue to assign additional sets of tasks to scheduler instance 22(1) which are picked up by execution contexts 34 and 38 for execution. Data 44(1) that identifies scheduler instance 22(1) is stored with any additional execution contexts allocated to scheduler instance 22(1).

Runtime environment 10 and/or process 12B, however, allows only tasks which are generated by task 36(2) on execution context 34(2) to be assigned to nested scheduler instance 22(2). In the example of FIG. 4B, a task 36(3) on execution context 34(3) is being executed by virtual processor 32(2) and a pool of execution contexts 38 are waiting to be executed by scheduler instance 22(2). Data 44(2) that identifies scheduler instance 22(2) is stored with execution contexts 34(2)-34(3) and 38 in scheduler instance 22(2).

Execution context 34(2) may eventually be returned to scheduler instance 22(1) as indicated in a block 78. To do so, data 44(2) is removed from execution context 34(2) so that data 44(1) indicates that execution context 34(2) belongs to scheduler instance 22(1). Where data 44(1) and 44(2) are stored as a stack, data 44(2) is popped from the top of the stack and data 44(1) returns to the top of the stack. A virtual processor 32 of scheduler 22(1) picks up execution context 34(2) for execution.

Using the method of FIG. 5, any number of scheduler instances 22 may be stacked or nested on each execution context 34 where each scheduler instance 22 includes a desired policy 37 that may differ from the policies 37 of other scheduler instances 22. Each execution context includes data 44 that identifies an assigned scheduler instance 22. New data 44 that identifies a new scheduler instance 22 is added (e.g., onto the stack) to an execution context each time that the execution context moves to a new scheduler instance 22.

In other embodiments, a nested scheduler instance 22 may be more closely integrated with a parent scheduler instance 22 to potentially allow resource sharing between the parent and nested scheduler instances 22.

Using the method of FIG. 5, library developers may advantageously create libraries that nest scheduler instances 22 with selected scheduler policies or policy preferences. This may allow a library developer to ensure that library functions in the library execute with the most suitable scheduler policies for the functions regardless of the scheduler policies of the overlying process. For example, task 36(2) on execution context 34(2) may represent a library function called by process 12B in the example of FIGS. 4A-4B. By using scheduler instance 22(2), execution context 34(2) may execute more efficiently than if it was executed by scheduler instance 22(1).

In one embodiment, processes 12A and 12B organize tasks into one or more schedule groups 90 and presents schedule groups 90 to scheduler instances 22. FIG. 6 is a block diagram illustrating an embodiment of a schedule group 90 for use in a scheduler instance 22.

Schedule group 90 includes a runnables collection 92, a realized task collection 93, a work collection 94, and a set of zero or more workstealing queues 96. Runnables collection 92 contains a list of unblocked execution contexts 38. A scheduler instance 22 adds an execution context 38 to runnables collections 92 when an execution context becomes unblocked. Realized task collection 93 contains a list of realized tasks 40 (e.g., unstarted agents) that may or may not have associated execution contexts 38. A scheduler instance 22 adds a realized task to realized task collection 93 when a new runnable task is presented to a scheduler instance 22 by process 12. Work collection 94 contains a list of workstealing queues 96 as indicated by an arrow 98 and tracks the execution contexts 34 that are executing tasks from the workstealing queues 96. Each workstealing queue 96 includes one or more unrealized tasks 42.

Using the embodiment of FIG. 6, a scheduler instance 22 may first search for unblocked execution contexts 38 in the runnables collection 92 of each schedule group 90 in the scheduler instance 22. The scheduler instance 22 may then search for realized tasks in the realized task collection 93 of all schedule groups 90 in the scheduler instance 22 before searching for unrealized tasks in the workstealing queues 96 of the schedule groups 90.

In one embodiment, a virtual processor 32 that becomes available may attempt to locate a runnable execution context 38 in the runnables collection 92 or a realized task 40 in the realized task collection 93 in the schedule group 90 from which the available virtual processor 32 most recently obtained a runnable execution context 38 (i.e., the current schedule group 90). The available virtual processor 32 may then attempt to locate a runnable execution context 38 in the runnables collections 92 or a realized task 40 in the realized task collection 93 in the remaining schedule groups 90 of the scheduler instance 22 in a round-robin or other suitable order. If no runnable execution context 38 is found, then the available virtual processor 32 may then attempt to locate an unrealized task 42 in the workstealing queues 96 of the current schedule group 90 before searching the workstealing queues 96 in the remaining schedule groups 90 of the scheduler instance 22 in a round-robin or other suitable order.

FIG. 7 is a block diagram illustrating an embodiment of a computer system 100 configured to implement runtime environment 10 with multiple scheduler instances 22 in process 12A or 12B. Computer system 100 includes one or more processor packages 102, a memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 include hardware threads 16(1)-16(M). Each hardware thread 16 in processor packages 102 is configured to access and execute instructions stored in memory system 104. The instructions may include a basic input output system (BIOS) or firmware (not shown), an operating system (OS) 120, a runtime platform 122, applications 124, and resource management layer 14 (also shown in FIG. 1). Each hardware thread 16 may execute the instructions in conjunction with or in response to information received from input/output devices 106, display devices 108, peripheral devices 110, and/or network devices 112.

Computer system 100 boots and executes OS 120. OS 120 includes instructions executable by hardware threads 16 to manage the components of computer system 100 and provide a set of functions that allow applications 124 to access and use the components. In one embodiment, OS 120 is the Windows operating system. In other embodiments, OS 120 is another operating system suitable for use with computer system 100.

Resource management layer 14 includes instructions that are executable in conjunction with OS 120 to allocate resources of computer system 100 including hardware threads 16 as described above with reference to FIG. 1. Resource management layer 14 may be included in computer system 100 as a library of functions available to one or more applications 124 or as an integrated part of OS 120.

Runtime platform 122 includes instructions that are executable in conjunction with OS 120 and resource management layer 14 to generate runtime environment 10 and provide runtime functions to applications 124. These runtime functions include a scheduler function as described in additional detail above with reference to FIG. 1. The runtime functions may be included in computer system 100 as part of an application 124, as a library of functions available to one or more applications 124, or as an integrated part of OS 120 and or resource management layer 14.

Each application 124 includes instructions that are executable in conjunction with OS 120, resource management layer 14, and/or runtime platform 122 to cause desired operations to be performed by computer system 100. Each application 124 represents one or more processes, such as processes 12A and 12B described above, that may execute with multiple scheduler instances 22 as provided by OS 120, resource management layer 14, and/or runtime platform 122.

Memory system 104 includes any suitable type, number, and configuration of volatile or non-volatile storage devices configured to store instructions and data. The storage devices of memory system 104 represent computer readable storage media that store computer-executable instructions including OS 120, resource management layer 14, runtime platform 122, and applications 124. The instructions are executable by computer system to perform the functions and methods of OS 120, resource management layer 14, runtime platform 122, and applications 124 described herein. Examples of storage devices in memory system 104 include hard disk drives, random access memory (RAM), read only memory (ROM), flash memory drives and cards, and magnetic and optical disks.

Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer readable storage device storing computer executable instructions that, when executed by a computer system, perform a method comprising:
   creating a first scheduler instance in a process with instructions executable by the computer system to cause a first set of tasks of the process to be executed by the computer system; and
   creating a second scheduler instance in a process with instructions executable by the computer system to cause a second set of tasks of the process to be executed by the computer system;
   allocating a first set of virtual processors to the first scheduler instance to represent a first subset of processor resources of the computer system;
   allocating a second set of virtual processors to the second scheduler instance to represent a second subset of processor resources of the computer system; and
   the first and second scheduler instances negotiating and managing processor resources of the computer system for executing the first set of tasks and the second set of tasks of the process, the negotiating transparent to the process, creating the second scheduler instance comprising:
   moving an execution context executing one of the first set of tasks from the first scheduler instance into the second scheduler instance; and
   executing the one of the first set of tasks as one of the second set of task.

2. The computer readable storage device of claim 1, the method further comprising:
   mapping the first set of virtual processors to a first set of hardware threads to cause the first set of tasks to be executed by the first set of hardware threads; and
   mapping the second set of virtual processors to a second set of hardware threads to cause the second set of tasks to be executed by the second set of hardware threads.

3. The computer readable storage device of claim 1, wherein creating the second scheduler instance further comprises:

storing data that identifies the first scheduler instance with the execution context prior to executing the one of the first set of tasks as one of the second set of tasks.

4. A method performed by a computer system, the method comprising:

identifying first and second policies of first and second scheduler instances, respectively, in a process, the first and second scheduler instances negotiating and managing processor resources of the computer system for executing sets of tasks of the process, the negotiating transparent to the process;

allocating a first set of virtual processors to the first scheduler instance to represent a first subset of processor resources of the computer system and allocating a second set of virtual processors to the second scheduler instance to represent a second subset of processor resources of the computer system;

assigning a first set of tasks of the process to one of the first and the second scheduler instances based on at least one of the first and the second policies; and creating the second scheduler instance in response to executing one of the first set of tasks in the first scheduler instance.

5. The method of claim 4 wherein the first and the second policies specify at least one of a number of processing resources, a sharing type, a priority type, a fairness type, a behavior type, an execution order type, or a topology type.

6. The method of claim 4 further comprising:

assigning the first set of tasks to the first scheduler instance based on the first policy; and attaching the one of the first set of tasks to a first virtual processor in the first scheduler instance to cause the one of the first set of tasks to be executed by a first hardware thread in the computer system.

7. The method of claim 6 further comprising:

assigning a second set of tasks to the second scheduler instance based on the second policy; and attaching one of the second set of tasks to a second virtual processor in the second scheduler instance to cause the one of the second set of tasks to be executed by a second hardware thread in the computer system.

8. A method comprising:

initiating first and second scheduler instances in a process, the first and second scheduler instances negotiating and managing processing resources of the computer system for executing sets of tasks of the process, the negotiating transparent to the process, the first and second scheduler instances having access to first and second subsets of processing resources from a set of the processing resources of the computer system, respectively, and first and second sets of tasks from the process, respectively;

allocating a first set of virtual processors to the first scheduler instance to represent a first subset of processor resources of the computer system and allocating a second set of virtual processors to the second scheduler instance to represent a second subset of processor resources of the computer system;

scheduling a first one of the first set of tasks for execution by one of the first subset of processing resources with the first scheduler instance;

scheduling one of the second set of tasks for execution by one of the second subset of processing resources with the second scheduler instance;

initiating the second scheduler instance in response to executing the one of the first set of tasks on a first execution context on the one of the first subset of processing resources in the first scheduler instance; and initiating the second scheduler instance to include the first execution context.

9. The method of claim 8 further comprising:

scheduling the first one of the first set of tasks for execution by the one of the first subset of processing resources by associating the one of the first set of tasks with a first execution context on one of a first set of virtual processors allocated to the first scheduler instance; and scheduling the one of the second set of tasks for execution by the one of the second subset of processing resources by associating the one of the second set of tasks with a first execution context on one of a second set of virtual processors allocated to the second scheduler instance;

wherein the first and the second subsets of processing resources including the first and the second sets of virtual processors, respectively.

10. The method of claim 9 further comprising:

mapping the one of the first set of virtual processors to a first hardware thread for execution of the first one of the first set of tasks; and mapping the one of the second set of virtual processors to a second hardware thread for execution of the one of the second set of tasks;

wherein the set of processing resources includes the first and the second hardware threads.

11. The method of claim 8 further comprising:

storing first data that identifies the first scheduler instance with the first execution context.

12. The method of claim 11 further comprising:

storing second data that identifies the first scheduler instance with a second execution context in the first scheduler instance; and storing third data that identifies the second scheduler instance with the first execution context.

13. The method of claim 12 further comprising:

storing the first data and the third data as a stack.

14. The method of claim 8 further comprising:

returning the first execution context in the second scheduler instance to the first scheduler instance.

15. The method of claim 8 further comprising:

scheduling a second one of the first set of tasks for execution by the one of the first subset of processing resources subsequent to initiating the second scheduler instance.

16. The method of claim 8 wherein the process is one of an application, a library function, or an operating system service.

* * * * *